United States Patent
Borkar (10) Patent No.: US 9,673,637 B2
(45) Date of Patent: Jun. 6, 2017

(54) ULTRA-CAPACITOR BASED ENERGY STORAGE IN A BATTERY FORM FACTOR

(75) Inventor: Shekhar Y. Borkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 13/992,627

(22) PCT Filed: Dec. 28, 2011

(86) PCT No.: PCT/US2011/067485
§ 371 (c)(1),
(2), (4) Date: Jun. 7, 2013

(87) PCT Pub. No.: WO2013/100932
PCT Pub. Date: Jul. 4, 2013

(65) Prior Publication Data
US 2013/0271091 A1    Oct. 17, 2013

(51) Int. Cl.
*H02J 7/00* (2006.01)
*H01M 10/42* (2006.01)
*H01G 11/14* (2013.01)

(52) U.S. Cl.
CPC ............ *H02J 7/00* (2013.01); *H01M 10/425* (2013.01); *H01G 11/14* (2013.01); *H01M 10/4264* (2013.01)

(58) Field of Classification Search
CPC ........................................... H02J 7/345
USPC ........................................... 320/167
See application file for complete search history.

(56) References Cited

U.S. PATENT DOCUMENTS

| | | | |
|---|---|---|---|
| 6,838,923 B2 | 1/2005 | Pearson | |
| 7,345,454 B2 | 3/2008 | Thrap | |
| 7,660,084 B2 | 2/2010 | Kim | |
| 9,153,994 B2* | 10/2015 | Wood | H02J 7/02 |
| 2005/0052169 A1* | 3/2005 | Thrap | 323/282 |
| 2005/0083020 A1* | 4/2005 | Baarman | 320/166 |

FOREIGN PATENT DOCUMENTS

| | | |
|---|---|---|
| TW | 478190 | 3/2002 |
| WO | 9952170 | 10/1999 |

OTHER PUBLICATIONS

PCT International Search Report and Written Opinion issued in corresponding PCT/US2011/067485 dated Sep. 12, 2012, (9 pages).

* cited by examiner

*Primary Examiner* — Edward Tso
*Assistant Examiner* — Ahmed Omar
(74) *Attorney, Agent, or Firm* — Trop Pruner & Hu, P.C.

(57) ABSTRACT

An ultra-capacitor based energy source may replace rechargeable and conventional batteries. It may have the form factor of a conventional battery and may emulate the discharge characteristics of the replaced battery.

26 Claims, 7 Drawing Sheets

ULTRA-CAPACITOR BASED ENERGY STORAGE IN A BATTERY FORM FACTOR

BACKGROUND

This relates to ultra-capacitor powered devices.

An ultra-capacitor based device typically uses a single capacitor or a series/parallel combination of several capacitors. When capacitors are connected in parallel, the effective capacitance increases, providing higher energy storage. Today, ultra-capacitors are limited to 2.7 Volts. Therefore, to increase their output voltage, capacitors are connected in series, which reduces their capacitance. However, since the stored energy is proportional to the square of the voltage, higher energy storage at higher voltages may result.

An ultra-capacitor is also known as a super capacitor, a super condenser, or an electric double-layer capacitor. They are distinguished from other capacitors because they have a separator between two plates, that effectively creates a double capacitor.

BRIEF DESCRIPTION OF THE DRAWINGS

Some embodiments are described with respect to the following figures.

DETAILED DESCRIPTION

The chemicals used in a conventional rechargeable, or standard disposable batteries, may be replaced with ultra-capacitors (sometimes also called super-capacitors) and supporting electronics. The form factor remains the same. The electronics is used for charging and controlled discharging of the capacitor to harvest energy, emulating a typical battery behavior. Thus existing devices using these new batteries do not experience any substantial difference in form factor or discharge characteristics.

Ultra-capacitors with electronics may replace the conventional rechargeable batteries, such as NiCd, NiMH, or Li-ion, or even regular disposable batteries. The ultra-capacitor and electronics are housed in conventional battery casings emulating batteries of standard sizes, such as AA, AAA, and so on, and the user devices may see no substantial difference in some embodiments. Embedded electronics controls charging and discharging of the capacitor to make the device behave like a battery, so the user experiences these devices as if they are batteries, not just in appearance but also in the discharge behavior. The only noticeable difference is that the charge on these new "batteries" may not last as long as a regular battery would. However, the charge may be sufficient for several applications where usage is not that prolonged, and the capacitor gets regularly recharged.

Some embodiments are also applicable to devices that currently use embedded batteries, where the electronics in one device is designed for conventional batteries. Therefore just replacing batteries with an ultra-capacitor may not be sufficient because a battery has a different discharge characteristic than a capacitor. Instead electronics may emulate the battery discharge behavior to more seamlessly replace batteries with these electronically enhanced ultra-capacitors.

Each ultra-capacitor container holds one or more ultra-capacitors in series/parallel combination, with a charging circuit for controlled charging. During charging operation the circuit detects that applied voltage is higher than that of a replaced battery, and goes into charging mode. The circuit also detects when the capacitor is being discharged, and activates a voltage converter, either in up or down conversion mode depending on the present voltage of the capacitor. In some embodiments, an output voltage of about 1.2V for rechargeable battery replacement and about 1.5V for standard disposable battery replacement is established. When the capacitor voltage is sufficiently reduced, with only reserve energy left, the circuit may create an output voltage to emulate low voltage behavior of the replaced battery, activating an existing low voltage indicator in the devices.

Potential applications of some embodiments include standard battery form factors, A, B, AA, AAA, etc. replacement for both rechargeable as well as single use disposable batteries, replaceable non-standard custom form factor batteries, and battery module replacement, such as two or three or more batteries in a module form, in appliances such as existing cordless phones, shavers, vacuum cleaners, etc.

Ultra-capacitors have very long life, on the order of 30 years or so, compared to a rechargeable battery which has a life on the order of two to three years. Standard disposable batteries have even shorter lifetimes. This battery replacement will save money in some embodiments.

Ultra-capacitors do not use toxic chemicals like batteries do, making them "greener" in some embodiments.

An ultra-capacitor may be lighter in weight in some cases.

An ultra-capacitor based solution may be inexpensive as the technology matures, compared to rechargeable batteries.

Figure 1:
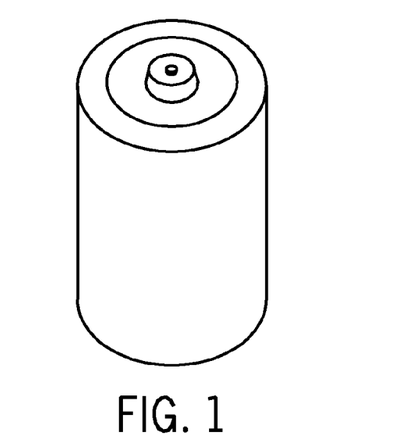
FIG. 1 is a perspective view of a capacitor based energy storage according to one embodiment.

A battery case houses ultra-capacitor and associated electronics to emulate the battery behavior as shown in FIG. 1. The electronic circuit connects to the battery terminals (only one shown) and charges the ultra-capacitor during the charging mode, and provides electrical energy to the battery terminals when it is not charging, emulating a typical battery replaced by the ultra-capacitor.

Figure 3A:
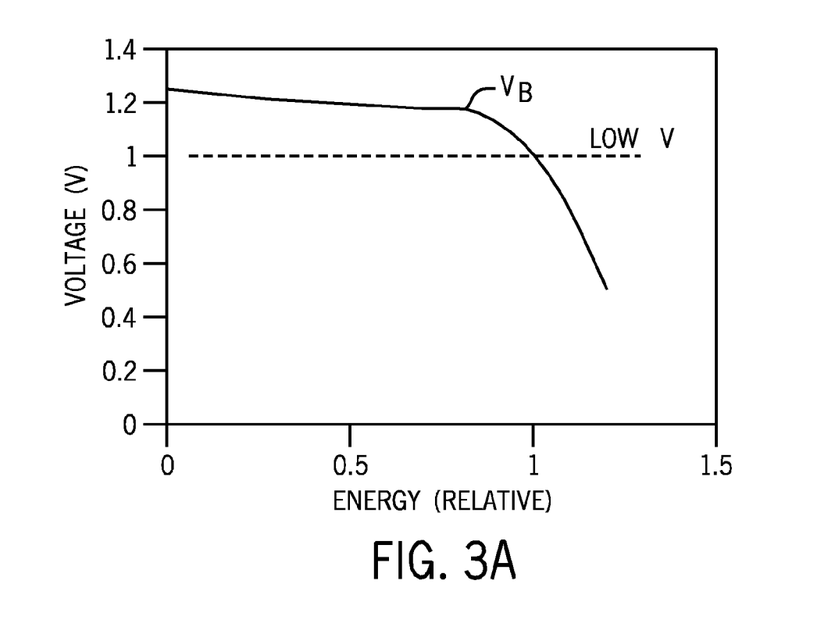
FIG. 3A is a graph of voltage versus energy for a rechargeable battery.

Typical discharge characteristics of a rechargeable battery are shown in FIG. 3A. (A disposable battery has the same characteristics except that the voltage level is different i.e. 1.5 volts). As energy is consumed out of the battery (X axis) the voltage at the terminal of the battery is fairly constant, at around 1.2V, until it reaches a certain energy threshold when the voltage drops rapidly.

Figure 3B:
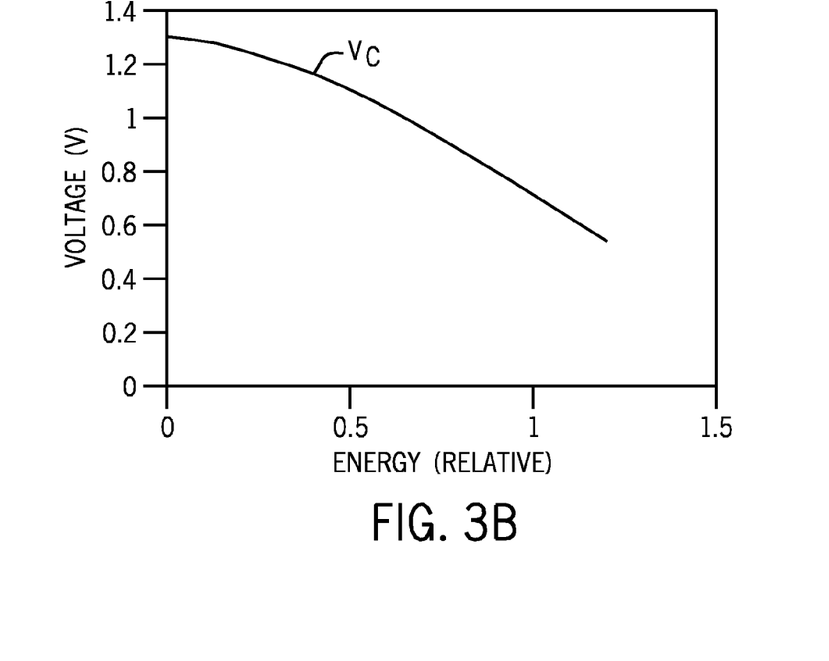
FIG. 3B is a graph of voltage versus energy for a capacitor.

FIG. 3B shows characteristics of a typical capacitor, where voltage continues to drop as the energy is consumed. Therefore, employing a capacitor as-is for energy storage would not emulate the battery behavior; the ultra-capacitor needs electronics to emulate the discharge behavior of the replaced battery. Electronics can be used to emulate a substantially constant voltage at the terminal of this emulated battery.

As the energy storage in the capacitor reaches a certain threshold, the electronics may reduce the voltage at the terminals, emulating a typical battery behavior to alert existing electronics in the appliance that energy reserves are getting low. For example, in a cordless phone, a red light starts blinking when the battery energy level is low. The same result can be caused to occur with the capacitor replacement.

The ultra-capacitor stores the electrical energy. It may be a single capacitor or a series/parallel combination of several capacitors. When capacitors are connected in parallel the effective capacitance increases, providing higher energy storage. Today, ultra-capacitors are limited to 2.7 Volts. Therefore, to increase voltage capacitors, are connected in series, which reduces the capacitance. However, since the stored energy is proportional to the square of the voltage, higher energy storage is provided at higher voltages.

Figure 2:
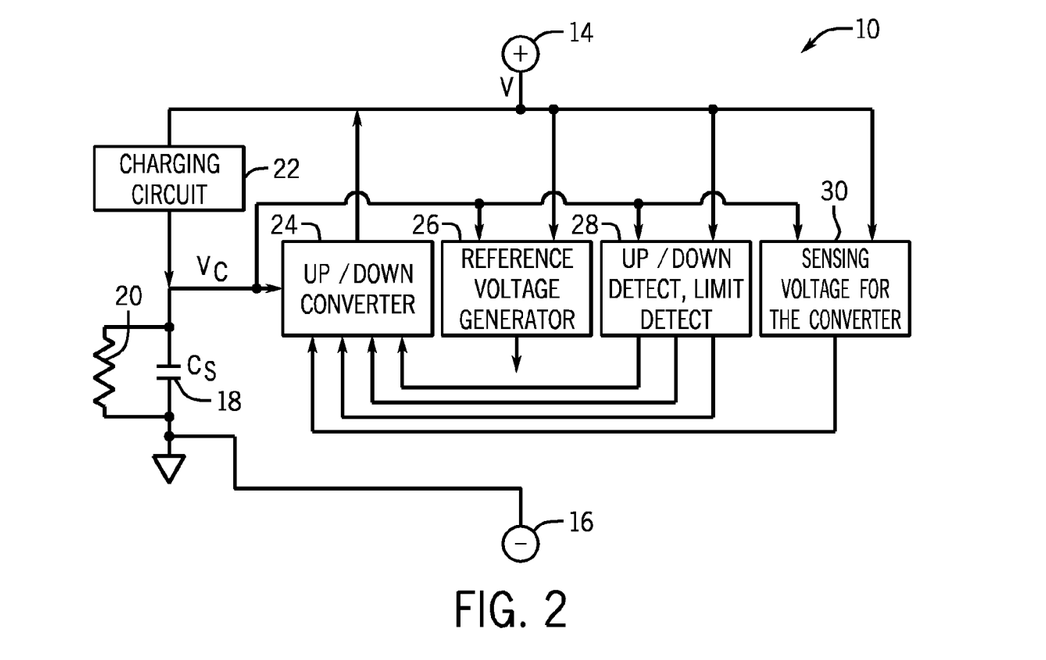
FIG. 2 is a schematic depiction for one embodiment.

FIG. 2 shows a device 10 for controlling the voltage produced by an ultra-capacitor 18 to make its discharge emulate the characteristics of a conventional battery. Ultra-capacitors exhibit leakage, represented by Rleak 20, causing discharge. Also, when the capacitors are used in series combination to increase voltage, leakage resistors are purposely added to even out the discharge of all the capacitors in the series stack. If the leakage is not evened out, uneven discharge could raise the the voltage across a capacitor beyond its maximum rated voltage, harming the capacitor.

A typical rechargeable battery gets charged by applying higher voltage (more than the 1.2V operating in this case) across the battery terminals. During the charging operation, the rest of the electronics is disabled since the energy is supplied to the battery. The sensing block 30 senses that the applied voltage is higher than nominal, turns off the converter 24, and enables the charging circuit 22 to charge the capacitor 18.

When the charging voltage is removed, the sensing block 30 detects that charging has ceased, turns off the charging circuit, and starts the up/down converter to convert voltage across the capacitor to the terminal voltage of the battery. Detect block 28 senses capacitor voltage to see if it is higher than the nominal voltage or not, and sets the direction of the up/down converter 24, that is, whether to convert voltage across the capacitor up or down. When the capacitor is fully charged at the charging voltage, say typically higher than 1.2V, this voltage needs to be converted down to 1.2V.

When the energy from the capacitor gets used, the voltage drops, and as it falls below 1.2V, the detect block 28 changes the direction of the converter 24 to up convert, converting capacitor voltage to a higher value presented at the terminals 14 and 16. As a result, the terminals of the device 10 experience a substantially constant 1.2 volts even though the voltage across the capacitor varies from higher than 1.2 volts at charging to lower than 1.2 volts with energy consumption. As used herein substantially constant means+10%.

As the energy in the capacitor drops, the detect circuit 28 detects the threshold where it needs to emulate low voltage of the battery, and sends signal to the converter 24 to emulate the low voltage of a battery by dropping the device 10 output voltage. Finally, when the voltage across the capacitor becomes too low for proper operation of the converter, the limit detect circuit 28 detects the limit and turns off the converter.

The reference voltage generator 26 creates a constant reference voltage, using both the terminal voltage as well as the capacitor voltage. This reference voltage is used by the entire system to compare voltages against this reference voltage.

Figure 4:
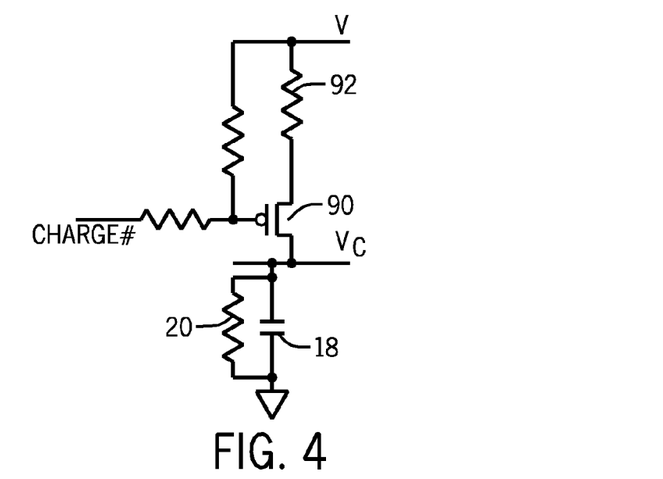
FIG. 4 is a depiction of the charging circuit according to one embodiment.

The charging circuit shown in FIG. 4 employs a PMOS transistor 90 with the resistor 92 used to limit the charging current. When the control signal charge# is asserted low by the sensing block 30, indicating that charging voltage is applied, the PMOS transistor is turned on to charge the capacitor 18. The voltage across the capacitor increases almost linearly, first with fast charging, and then it asymptotically settles down to the applied charging voltage.

Figure 5:
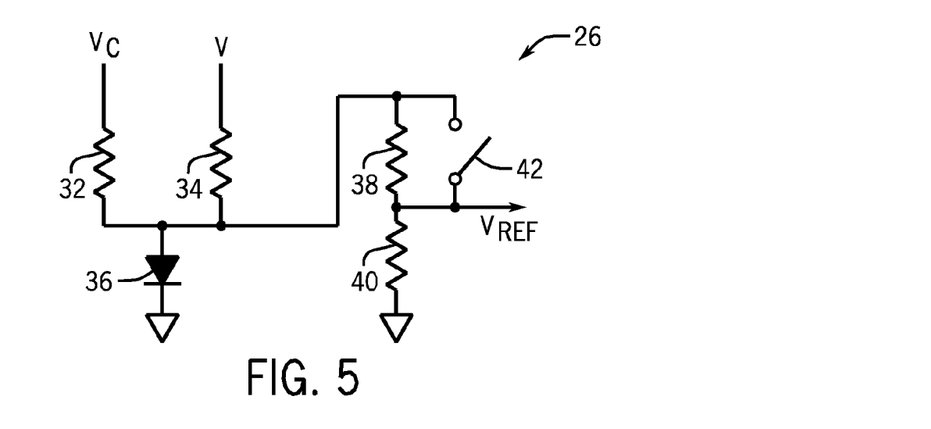
FIG. 5 is a circuit schematic for a voltage reference generator according to one embodiment.

FIG. 5 shows a simple voltage reference generator 26 using a forward biased diode 36. The voltage across the diode is derived from a terminal (V), as well as from the capacitor (Vc) through resistors 32, 34. The voltage across the diode may be fairly constant, around 0.6V in one embodiment. Several other accurate voltage reference circuits are well known in the art, and may be employed as well.

A switch 42 is used to select what kind of battery is being emulated. If the switch is on, then the full diode voltage is presented as a reference voltage, VREF, to emulate higher voltage (1.5V for disposable batteries) at the terminal. If the switch is off, then the two resistors 38 and 40 act as potential dividers, presenting lower than 0.6V as the reference to emulate lower battery voltage, such as 1.2V for rechargeable batteries. This is just one possible way of implementing the selection of rechargeable versus disposable battery, and there are numerous ways of implementing this feature.

Figure 6:
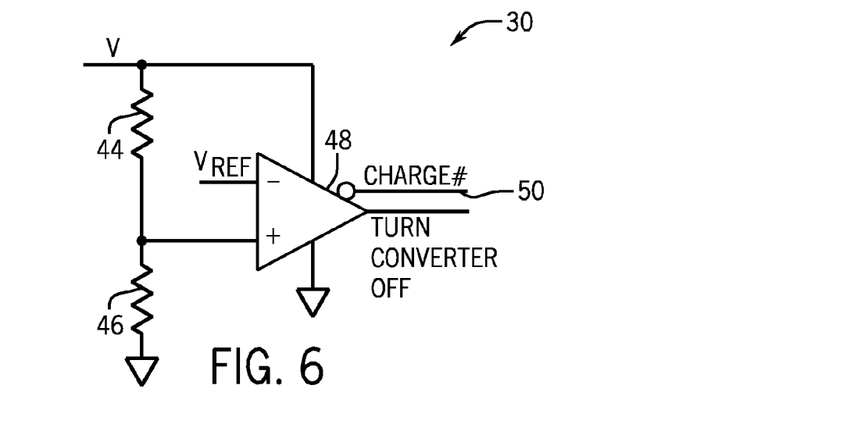
FIG. 6 is a circuit schematic for developing a sensing voltage for the sensing block according to one embodiment.

FIG. 6 shows a circuit to sense voltage in block 30. In this circuit the operational amplifier 48 compares a ratio (created by resistors 44 and 46) of the terminal voltage at the terminals with the reference voltage, VREF. If the terminal voltage is higher, then that indicates the capacitor is being charged. The operational amplifier asserts the charge# signal 50 to enable the charging circuit 22 and turns off the up/down converter 24. If the voltage is low, then the charging circuit is turned off and the up/down converter is enabled.

Figure 7:
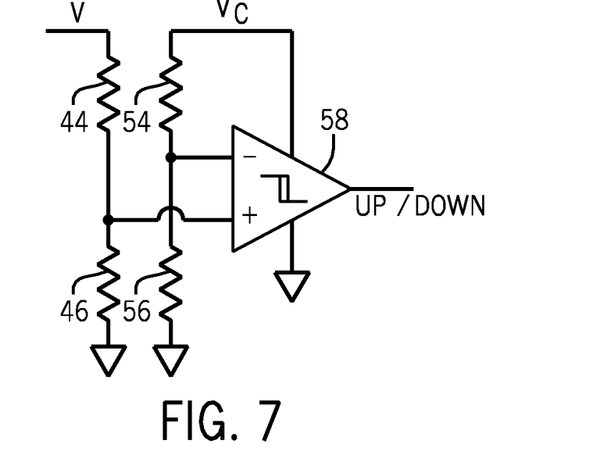
FIG. 7 is a circuit schematic for an up-down control in the limit detect shown in FIG. 2 according to one embodiment.

FIG. 7 shows the up down control implemented in uploading detect circuit 28. This circuit determines the up or down mode of conversion by comparing the capacitor voltage with the terminal voltage.

The comparator is an operational amplifier 58 implemented with hysteresis for stable decision at the output without any oscillations. The inputs compare a fixed ratio of terminal voltage created by resistors 44 and 46, against the ratio of voltage across the capacitor created by resistors 54 and 56. If the voltage across the capacitor is higher than the terminal voltage then it asserts down convert at the output, and vice versa. The output signal controls the converter whether to convert the capacitor's voltage up or down for a constant voltage at the terminals.

Figure 10:
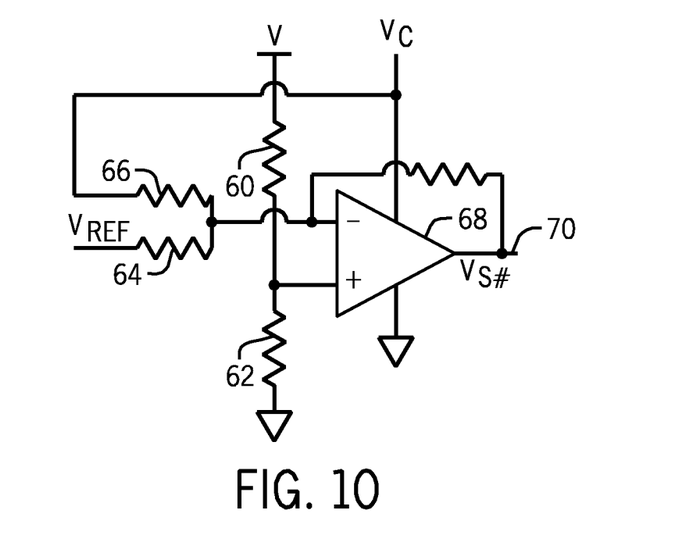
FIG. 10 is a low voltage detect circuit for one embodiment.
Figure 12:
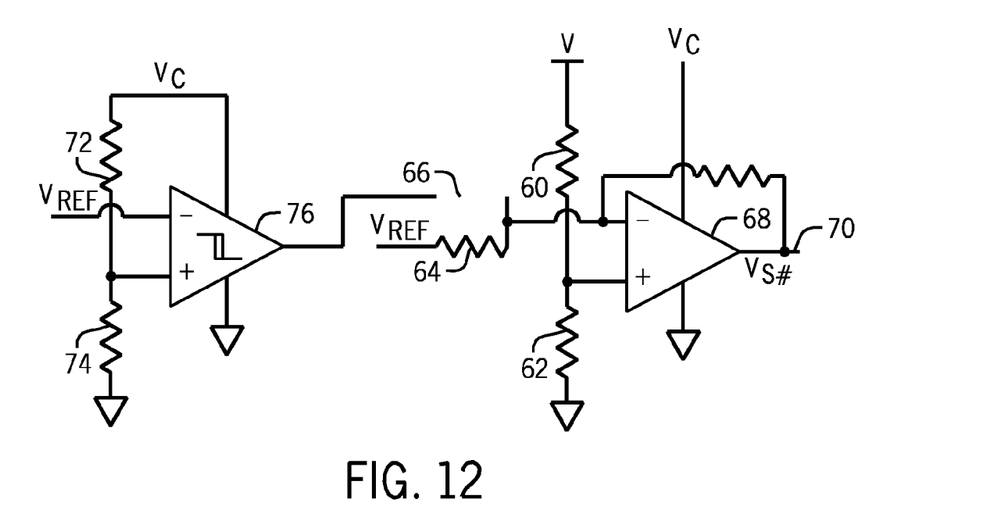
FIG. 12 is a low voltage detect circuit for another embodiment.

As the capacitor energy gets consumed, the voltage across the capacitor falls, and it reaches a point where limited energy is left and the terminal voltage reaches the low voltage of the replaced battery. This low voltage detected by the device 10 is an indication that limited energy is left. The user, may be notified for example by illuminating a red light in several appliances. FIGS. 10 and 12 show two such implementations to emulate low voltage of the battery.

Figure 8:
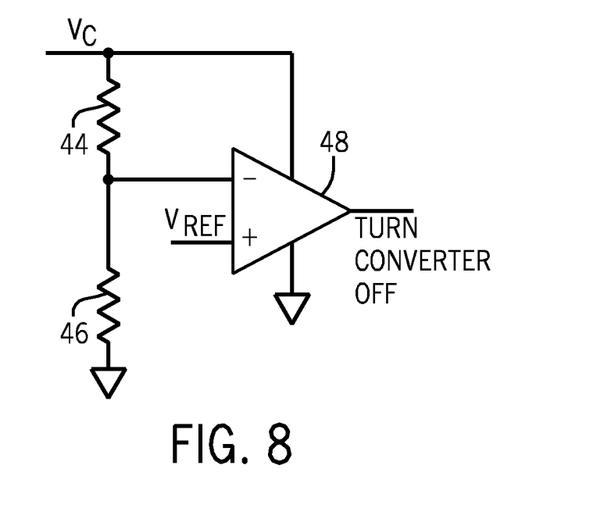
FIG. 8 is a circuit to turn off the voltage converter used in the circuit 24 according to one embodiment.

As the capacitor voltage continues to fall due to energy consumption, when it reaches the limit where the voltage converters may not operate reliably, the circuit shown in FIG. 8 turns off the voltage converter 24 at that point. The two resistors, 44 and 46 create a ratio of the capacitor voltage which is compared against the reference, and if the voltage is too low then the operational amplifier 48 signals the converter to turn off.

Figure 9:
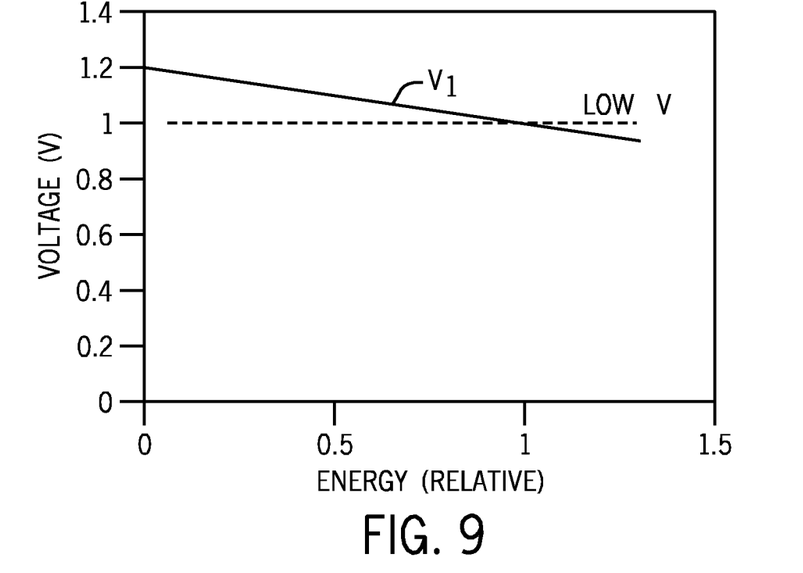
FIG. 9 is a graph of voltage versus energy for one embodiment using the circuit of FIG. 10.
Figure 11:
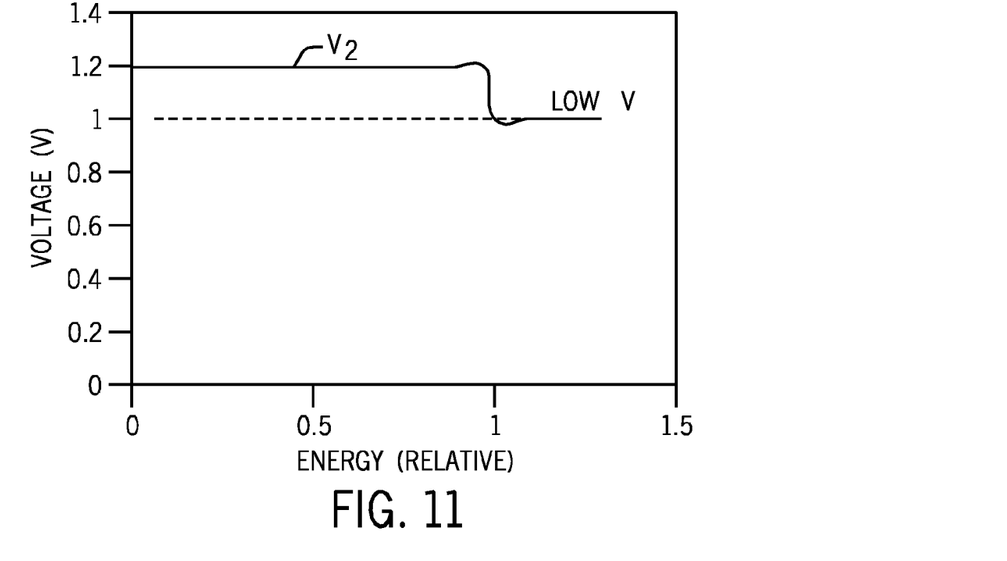
FIG. 11 is a graph of voltage versus energy to one embodiment using the circuit of FIG. 12.

FIG. 9 shows gradual change in the terminal voltage with circuit implemented in FIG. 10, and FIG. 11 shows an abrupt change when implemented with circuit in FIG. 12. As the capacitor voltage continues to fall due to energy consumption, and when it reaches the limit where the voltage converters may not operate reliably, the circuit shown in FIG. 8 turns off the voltage converter.

In FIG. 10, the operational amplifier is used as an analog adder circuit, adding part of the capacitor voltage Vc to the reference 68 voltage Vref, using the resistor 60. The resulting signal Vs#70 is the sense voltage used by the voltage converter to adjust the terminal voltage. Since the sense voltage is biased by the capacitor voltage, which decreases with energy consumption, the voltage converter is tricked into converting lower voltage at the terminal as the capacitor voltage falls. The values of the resistors determine the rate of fall of the output voltage at the terminals and should be chosen accordingly.

FIG. 12 shows a slight modification to this circuit with a Schmitt trigger front end to detect when the capacitor voltage has reached to the reserve limit, and then it abruptly changes the sense voltage, and the voltage converter abruptly changes the terminal voltage to indicate low voltage of the battery.

Figures 13, 14:
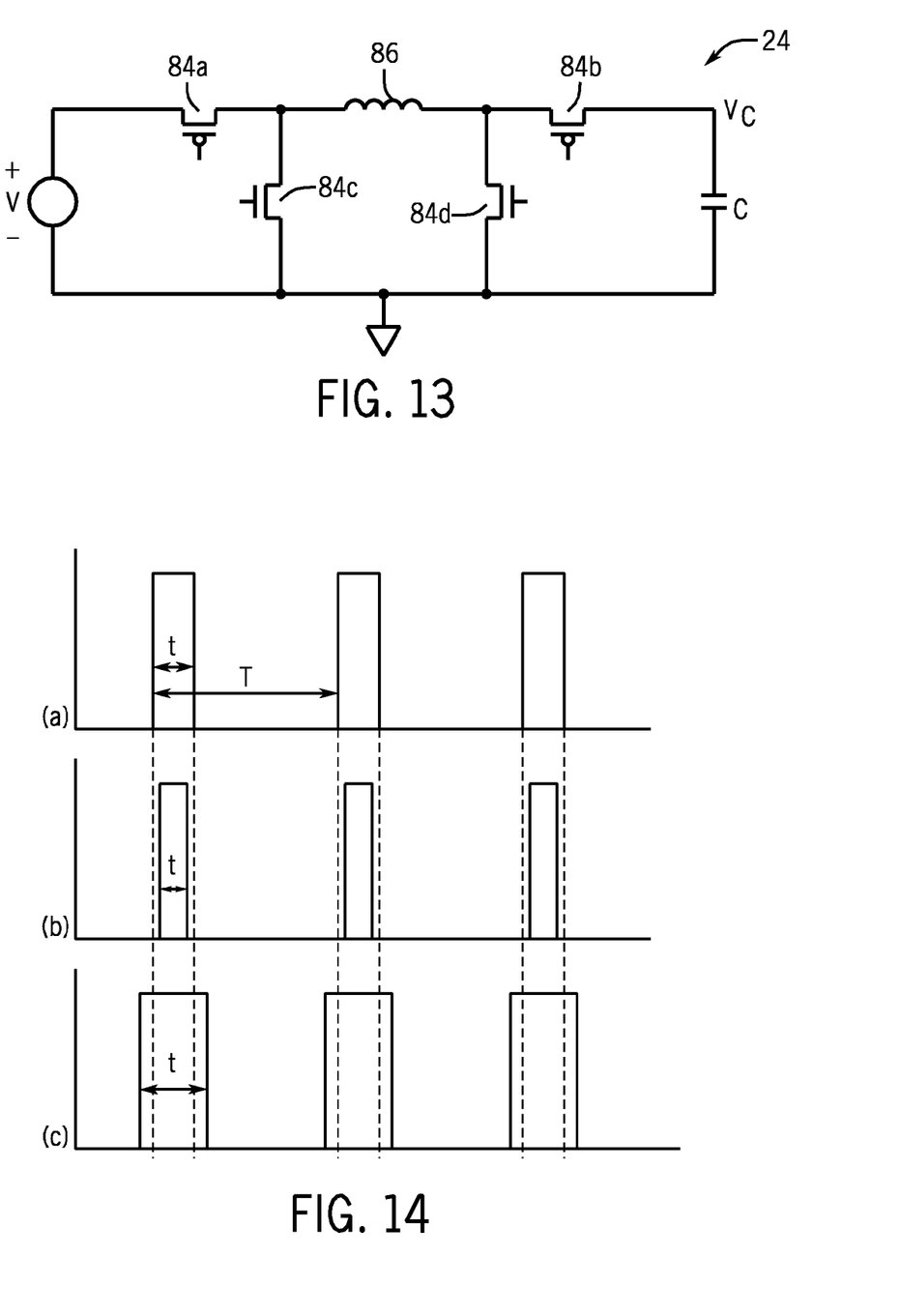
FIG. 13 is one embodiment of an up/down converter.
FIG. 14 shows the waveforms for operation of the voltage converter according to one embodiment.

FIG. 13 shows the operation of the converter 24 (FIG. 2) using MOS transistors 84 as switches. The converter steps the voltage down using transistors 84a and 84c when the voltage across the capacitor is higher than the terminal voltage. The switches 84b and 84d step up convert when the voltage across the capacitor falls below the terminal voltage.

FIG. 14 shows typical switching diagram depicting the operation of the converter with pulse width modulation. The vertical axis is voltage and the horizontal axis is time. The nominal pulse width t and the nominal period T are shown in FIG. 15a. Then in FIG. 15b, the nominal pulse width t is reduced. This is because of the situation where the sense voltage is greater than the reference voltage so that there is a higher terminal voltage. This results in reducing the current in the inductor 86 of the up/down converter shown in FIG. 14. To accommodate this situation, the pulse width is reduced. In FIG. 15c the pulse width t is increased because the sense voltage is less than the reference voltage. This means there is a lower terminal voltage and so it is necessary to increase the current in the inductor 86 (FIG. 13).

All of the active circuits described above can be implemented with either discrete or integrated electronics. An integrated version will undoubtedly be smaller and efficient. Passive elements such as capacitors and inductors are fairly small, and they could be discrete, or they could be integrated with the electronics as well. The size of the electronics is very small compared to the volume of typical battery housing. And most of the volume can be dedicated to the ultra-capacitor for energy storage.

MOS transistors are shown but bipolar transistors can be substituted. For a single battery replacement, MOS transistors are probably more suitable since they have low threshold voltage Vt than forward bias voltage Vbe of a bipolar transistor, making circuits easier to design and more efficient. For higher voltages, such as battery modules, either MOS or bipolar transistors are equally suitable.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a housing in the form factor of a battery;
   an ultra-capacitor for electric energy storage, and
   with electronics in said housing to emulate discharge characteristics of the battery wherein said electronics includes a detector to determine whether to reduce or increase a capacitor voltage of the ultra-capacitor by comparing the capacitor voltage with a terminal voltage across battery terminals using an operational amplifier implemented with hysteresis and by comparing a fixed ratio of the terminal voltage created by one or more resistors against a ratio of the capacitor voltage created by one or more resistors, and one or more voltage converters for down converting and up converting the capacitor voltage.

2. The apparatus of claim 1 wherein said apparatus emulates a rechargeable battery discharge characteristic.

3. The apparatus of claim 1 wherein said apparatus emulates a disposable battery discharge characteristic.

4. The apparatus of claim 1 wherein said electronics to maintain a substantially constant output voltage for said apparatus.

5. The apparatus of claim 4 including a step down, step up, and a combined voltage converter to maintain constant voltage at terminals of the apparatus.

6. The apparatus of claim 1 said apparatus to reduce output voltage to a level to activate a battery low voltage indicator.

7. The apparatus of claim 1 having an output voltage of about 1.2V.

8. The apparatus of claim 1 having an output voltage of about 1.5V.

9. The apparatus of claim 1 having an output voltage of less than 2 volts.

10. A method comprising:
    housing an ultra-capacitor in the form factor of a battery; and
    emulating discharge characteristics of the battery using the ultra-capacitor wherein said electronics includes a detector to determine whether to reduce or increase a capacitor voltage of the ultra-capacitor by comparing the capacitor voltage with a terminal voltage across battery terminals using an operational amplifier implemented with hysteresis and by comparing a fixed ratio of the terminal voltage created by one or more resistors against a ratio of the capacitor voltage created by one or more resistors, and one or more voltage converters for down converting and up converting the capacitor voltage.

11. The method of claim 10 wherein emulating includes emulating a rechargeable battery discharge characteristic.

12. The method of claim 10 wherein emulating includes emulating a disposable battery discharge characteristic.

13. The method of claim 10 including maintaining a substantially constant output voltage from said ultra-capacitor to maintain constant voltage at terminals of the battery.

14. The method of claim 13 stepping down and stepping up voltage produced by said ultra-capacitor.

15. The method of claim 10 including reducing an output voltage to a level to activate a battery low voltage indicator.

16. The method of claim 10 including producing an output voltage of about 1.2V using said ultra-capacitor.

17. The method of claim 10 including producing an output voltage of about 1.5V using said ultra-capacitor.

18. The method of claim 10 including producing an output voltage of less than 2 volts using said ultra-capacitor.

19. An apparatus comprising:
a housing in the form factor of a battery, said housing including terminals;
an ultra-capacitor for electric energy storage, and
with electronics in said housing to maintain a substantially constant voltage at the terminals of the apparatus wherein said electronics includes a detector to determine whether to reduce or increase a capacitor voltage of the ultra-capacitor by comparing the capacitor voltage with a terminal voltage across battery terminals using an operational amplifier implemented with hysteresis and by comparing a fixed ratio of the terminal voltage created by one or more resistors against a ratio of the capacitor voltage created by one or more resistors, and one or more voltage converters for down converting and up converting the capacitor voltage.

20. The apparatus of claim 19 wherein said apparatus emulates a rechargeable battery discharge characteristic.

21. The apparatus of claim 19 wherein said apparatus emulates a disposable battery discharge characteristic.

22. The apparatus of claim 19 including a step down, step up, and a combined voltage converter.

23. The apparatus of claim 19 said apparatus to reduce output voltage to a level to activate a battery low voltage indicator.

24. The apparatus of claim 19 having an output voltage of about 1.2V.

25. The apparatus of claim 19 having an output voltage of about 1.5V.

26. The apparatus of claim 19 having an output voltage of less than 2 volts.

* * * * *